Figure 2:
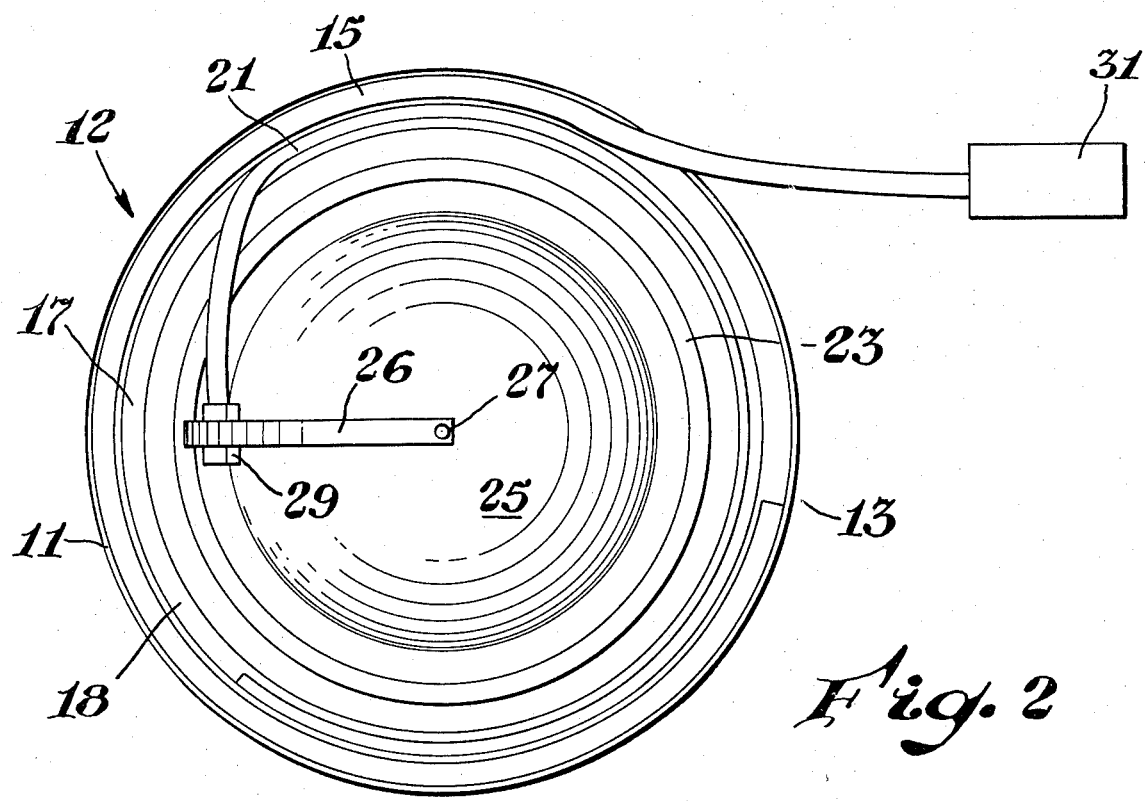

United States Patent [19]

Hay, II

[11] B 3,923,573

[45] Dec. 2, 1975

[54] METHOD AND APPARATUS FOR CONSTRUCTION

[75] Inventor: Robert A. Hay, II, Midland, Mich.

[73] Assignee: The Dow Chemical Company, Midland, Mich.

[22] Filed: Nov. 1, 1972

[21] Appl. No.: 302,836

[44] Published under the Trial Voluntary Protest Program on January 28, 1975 as document no. B 302,836.

[52] U.S. Cl. .................... 156/192; 52/80; 156/186; 156/195; 156/256; 156/304; 156/445; 156/544; 156/574; 264/32; 425/60; 425/375
[51] Int. Cl.² .................... B31C 13/00; B29C 23/00
[58] Field of Search ............ 156/71, 169, 170, 172, 156/180, 186, 213, 244, 304, 445, 475, 500, 544, 574, 576, 577, 195, 192, 256; 52/80; 33/21 B; 264/32, 248; 425/60, 63, 109, 375; 248/346; 198/102; 249/13

[56] References Cited
UNITED STATES PATENTS

| | | |
|---|---|---|
| 2,154,333 | 4/1939 | Kampfer .............................. 156/244 |
| 3,337,384 | 8/1967 | Wright ................................ 156/180 |
| 3,352,525 | 11/1967 | Lowes .................................. 264/32 |
| 3,358,325 | 12/1967 | Chisholm .............................. 52/80 |
| 3,365,855 | 1/1968 | Vermette ............................... 52/80 |
| 3,372,430 | 3/1968 | Lowes .................................. 425/60 |
| 3,376,602 | 4/1968 | Lowes .................................. 425/60 |
| 3,412,426 | 11/1968 | O'Dell, Jr. ............................. 52/80 |
| 3,507,735 | 4/1970 | Chisholm ............................. 156/500 |
| 3,590,448 | 7/1971 | Bryant ................................. 52/80 |
| 3,616,070 | 10/1971 | Lemelson ............................ 156/244 |

*Primary Examiner*—Douglas J. Drummond
*Assistant Examiner*—Basil J. Lewis
*Attorney, Agent, or Firm*—Robert B. Ingraham

[57] ABSTRACT

Long lengths of material are employed for the spiral generation of structures employing two generally concentric conveyors. A strip is fed from the inner conveyor to a spiral generation head while a second strip from a strip forming apparatus is fed to the outer conveyor.

6 Claims, 2 Drawing Figures

U.S. Patent  Dec. 2, 1975  3,923,573

METHOD AND APPARATUS FOR CONSTRUCTION

Spiral generation of structures from preformed strips is well known and is described in U.S. Pat. Nos. 3,206,899; 3,337,384; 3,358,325; 3,372,430; 3,372,431; 3,376,602; 3,442,992 and 3,507,735. Such spiral generation techniques in the past have been practiced employing relatively short lengths of structural or insulating material such as rectangular foamed plastic strips and such short lengths have been joined either on the structure or just prior to deposition on the structure. Such joining as a structure is prepared becomes inconvenient and often is done at some height above ground or floor level. Oftentimes it is desirable to employ foam plastic strips having laminated to at least one surface thereof an outer facing of weather resistant material; for example, aluminum foil. If short strips or structural material are employed, numerous joints must be sealed in the resultant structure. It would be of significant advantage to employ strips of much greater length in that the number of joints to be sealed on the finished structure would be substantially less. Oftentimes sealing short strips adjacent the foam depositing head is undesirable, particularly when structures are being formed in confined spaces; for example, in the insulation of a tank in the hold of a ship or in a building with minimal clearance.

It would be desirable if there were available an improved method and apparatus for the preparation of spirally generated structures.

It would also be desirable if there were an improved method and apparatus available to permit the preparation of spirally generated structures from relatively long lengths of structural material.

It would further be desirable if there were available such a method which would permit long lengths of material to be employed in a spiral generation process wherein the strip source and the structure being formed are stationary relative to each other.

These benefits and other advantages in accordance with the present invention are achieved in a method for the fabrication of a spirally generated structure wherein a strip of structural material is deposited successively in a plurality of turns, and adjacent turns bonded to each other to form a unitary structure by means of a material depositing head moving in a generally helically spiral pattern, the improvement which comprises providing first and second generally endless conveyors disposed about at least a portion of the structure, the second conveyor disposed within said first conveyor and the second conveyor being generally coextensive with the first conveyor, providing a first strip of structural material to at least one of said conveyors, the strip having a length equal to at least one quarter the length of said conveyor, subsequently passing the strip to the depositing head and supplying a second strip of structural material to the remaining conveyor.

Also contemplated within the scope of the present invention is an apparatus suitable for handling elongate strip-like materials useful for the preparation of spirally generated structures, the apparatus comprising a first conveyor of generally closed configuration having an upwardly facing material receiving surface, a second conveyor disposed within the first conveyor of generally like configuration to the first conveyor and having a generally upwardly facing material receiving surface.

Figure 1:
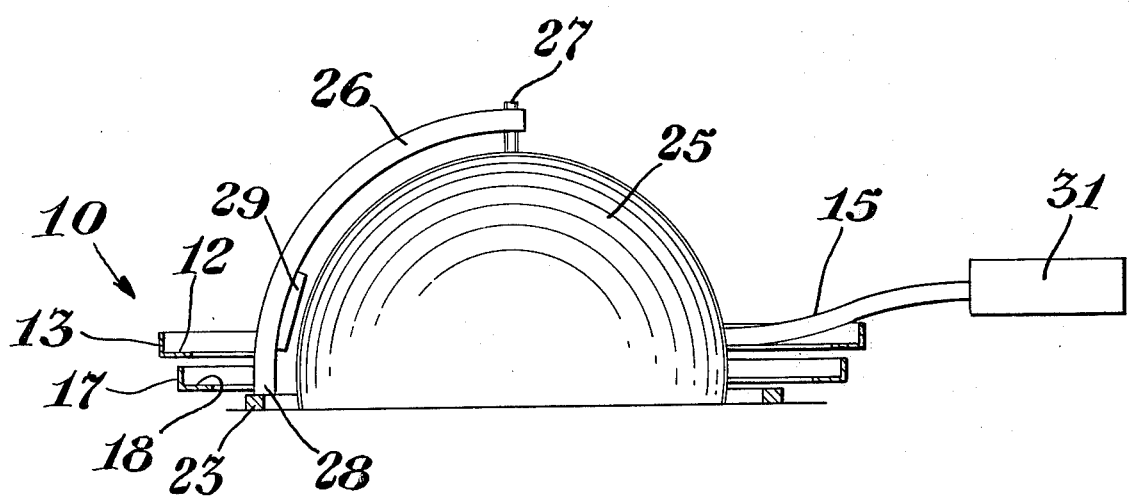

Further features and advantages of the present invention will become more apparent from the following specification taken in connection with the drawing wherein:

FIG. 1 schematically depicts the apparatus and method of the present invention.

FIG. 2 is a top view of the apparatus of FIG. 1.

In FIGS. 1 and 2 there is depicted an apparatus in accordance with the present invention generally designated by the reference numeral 10. The apparatus 10 comprises in cooperative combination a first conveyor 11. The conveyor 11 has an upwardly facing material receiving surface 12 and an outer peripheral retaining flange 13. The conveyor 11 is beneficially of endless configuration and as depicted in FIG. 1 is circular. The material receiving surface 12 of the conveyor may be of any configuration suitable to the particular strip material being handled. The surface 12 may be a plurality of rolls or a so-called roller skate conveyor having a plurality of narrow rolls without a driving means, or alternately it may be a driven moving belt. A strip 15 of structural material is shown disposed on the material receiving surface 12 of the conveyor 11. The flange 13 may be any desirable smooth surface, or alternately a driven belt if desirable. Sheet metal is found to be satisfactory in many instances where friction with the strip material is not high. Disposed within the first conveyor 11 is a second conveyor 17 having an upwardly disposed material sealing surface 18 and a flange 19. The conveyor 17 beneficially is of generally identical construction to the conveyor 11 and as depicted is of smaller dimension. A second strip of construction material 21 is disposed on the surface 18 of the conveyor 17. Within the conveyor 17 is disposed a track or guide 23 generally concentrically disposed relative to the conveyors 11 and 17. Within the track or guide 23 there is depicted a structure 25 having generally circular cross-section upon which it is desired to deposit insulating material such as the strip 21 to form an insulated structure surrounding the structure 25. A boom 26, one end of which is pivoted at a pivot 27, is generally centrally disposed in the structure 25. The remaining end, designated by the reference numeral 28, travels on the guide 23 by guide means, not shown. A material depositing head 29 is moveably affixed to the boom 26 and deposits successive strips of material such as the material 21 to form the desired structure. A strip source or material handler is disposed generally adjacent the outer conveyor 11 and provides a generally identical source of strips 15 which are fed to the outer conveyor 11. The supply source 31 beneficially may be a plastics extruder/laminator combination extruding a foam plastic body and laminating an appropriate reinforcement thereto. Alternately, it may receive relatively short preformed construction material strips such as foamed planks, heat sealing the ends together and optionally provide reinforcement, surface finish and the like.

In operation of the apparatus of FIGS. 1 and 2, the material source provides a generally continuous strip of construction material to the first conveyor 11. The material progresses along the conveyor until a strip of desired length is obtained, preferably a length not greater than the length of the second conveyor 17. When sufficient material has been provided to the first conveyor 11, the strip is cut and moved onto the second conveyor in the position indicated by the strip 21; having been moved onto the inner conveyor it is then passed to the depositing head 29 and deposited in a generally spiral manner while being adhered to the adjacent strip to form a unitary structure which beneficially may be free standing, or alternately, as depicted in FIGS. 1 and 2, serve as an enclosure for an existing structure. Conveniently, the relatively long strips such as the strip 21 may be joined to a strip of which a major portion has been deposited at a location adjacent the second conveyor 17 by hand bonding with fast setting adhesives or hand operated heat sealers. Alternately, such a joint may be made after the strip has been deposited on the structure. As depicted in FIGS. 1 and 2, strips such as the strips 15 and 21 are free to move readily upon the conveyors. Alternately, the strips may be deposited on either conveyor and passed to the depositing head without transferring from the first to second conveyors. Relatively little strain such as tension is placed thereon in the handling of the strip. The method and apparatus of the present invention provide substantial convenience and reduce the amount of hand work required to prepare spirally generated structures from preformed strips.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the fabrication of a spirally generated structure wherein a strip of structural material is deposited successively in a plurality of turns, and adjacent turns bonded to each other to form a unitary structure by means of a material depositing head moving in a generally helically spiral pattern, the improvement which comprises providing a first generally endless conveyor disposed about at least a portion of the structure, providing a second conveyor within said first conveyor and the second conveyor being generally coextensive therewith, providing to one conveyor a first strip of structural material having a length at least about one quarter the length of the conveyor, passing the first strip to the depositing head and supplying a second strip of structural material to the remaining conveyor, and subsequently passing the second strip to the depositing head and providing another strip to replace the first strip on the one conveyor.

2. The method of claim 1 wherein the strips of structural material have a length about equal to the length of the second conveyor.

3. The method of claim 1 including the step of bonding together adjacent ends of strips of the structural material prior to depositing the strip.

4. The method of claim 1 including the step of providing an endless strip of structural material and severing the strip to desired lengths.

5. The method of claim 1 including the steps of providing the first strip of structural material about the length of the second conveyor, bonding the ends of the first and second strips together prior to deposition.

6. An apparatus suitable for handling elongate strip-like materials useful for the preparation of a spirally generated structure, the apparatus comprising a first conveyor of generally circular closed cell configuration having an upwardly facing material receiving surface, a second conveyor disposed within the first conveyor and of generally like configuration to the first conveyor and having a generally upwardly facing material receiving surface, the material receiving surfaces of the first and second conveyors being generally composed of a plurality of rolls, the material receiving surface of the second conveyor being displaced below the surface of the first conveyor by a distance approximating the thickness of strip-like material to be handled.

* * * * *